United States Patent [19]
Corcoran et al.

[11] Patent Number: 5,197,039
[45] Date of Patent: Mar. 23, 1993

[54] METHODS FOR PROCESSING SEISMIC DATA

[75] Inventors: Chris T. Corcoran; Aaron J. Seriff, both of Houston, Tex.

[73] Assignee: Shell Oil Company, Houston, Tex.

[21] Appl. No.: 174,658

[22] Filed: Mar. 29, 1988

[51] Int. Cl.$^5$ ............................................. G01V 1/36
[52] U.S. Cl. ....................................... 367/52; 367/47
[58] Field of Search ...................... 367/50, 51, 52, 53, 367/47; 364/421

[56] References Cited

U.S. PATENT DOCUMENTS

| | | | |
|---|---|---|---|
| 3,597,727 | 8/1971 | Judson et al. | 340/15.5 |
| 4,241,429 | 12/1980 | Bloomquist et al. | 367/52 |
| 4,503,527 | 3/1985 | Pann | 367/53 |
| 4,534,019 | 8/1985 | Wiggins et al. | 367/75 |
| 4,633,447 | 12/1986 | Bodine | 367/70 |
| 4,646,239 | 2/1924 | Bodine et al. | 364/421 |
| 4,736,347 | 4/1988 | Goldberg et al. | 367/53 |
| 4,779,237 | 10/1988 | Bodine | 367/47 |

FOREIGN PATENT DOCUMENTS

| | | |
|---|---|---|
| 14648/83 | 11/1984 | Australia . |
| 2090409A | 7/1982 | United Kingdom . |
| 2161933A | 1/1986 | United Kingdom . |

OTHER PUBLICATIONS

Spratt, S., "Effect of NMO Errors on AVO Derived Shear Reflectivity", 57th Annual Int. SEG Mtg., Oct. 11, 1987.

Bull Seismol Soc. Am., vol. 66, 1976, pp. 1881–1885, Young, G. B., and Braille, L. W.

Velocity Spectra-Digital Computer Derivation and Applic. of Velo. Functions, Geophysics, 34, pp. 859∝881, 1968, Tanner, M. T. & Koehler F.

Numerical Applications of a Formalism for Geophysical Inverse Prob., Geophys. J. R. Astr. Soc., 13, pp. 247–276, 1967, Backus, G. & Gibert, F.

The Resolving Power of Gross Earth Data, Geophys. J. R. Astr. Soc., 16, pp. 169–205, (1988), Backus, G. & Gibert, F.

Uniqueness in the Inversion of Inaccurate Gross Earth Data, Phil. Trans. Ray. Soc., London, 266, pp. 123–192, 1970, Backus, G. & Gibert, F.

Primary Examiner—Ian J. Lobo

[57] ABSTRACT

The present invention provides methods for processing seismic data which include performing normal moveout velocity analysis in such a manner as to include the effects of the offset dependence of reflection amplitude and simultaneously determining from the seismic data the moveout velocity and the variation of reflection amplitude with offset.

12 Claims, 10 Drawing Sheets

FIG.2A
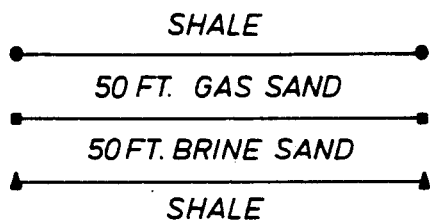
FIG.2B
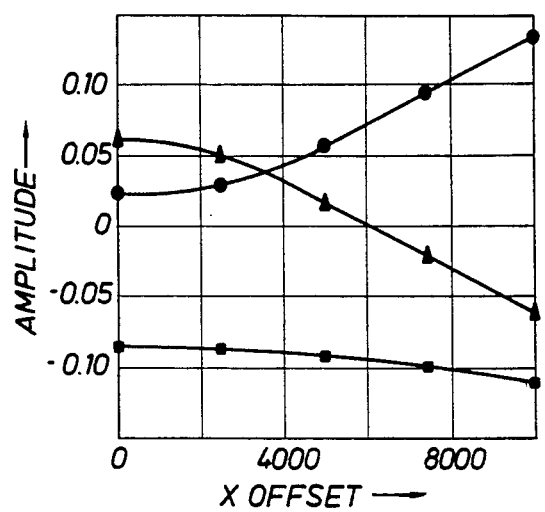
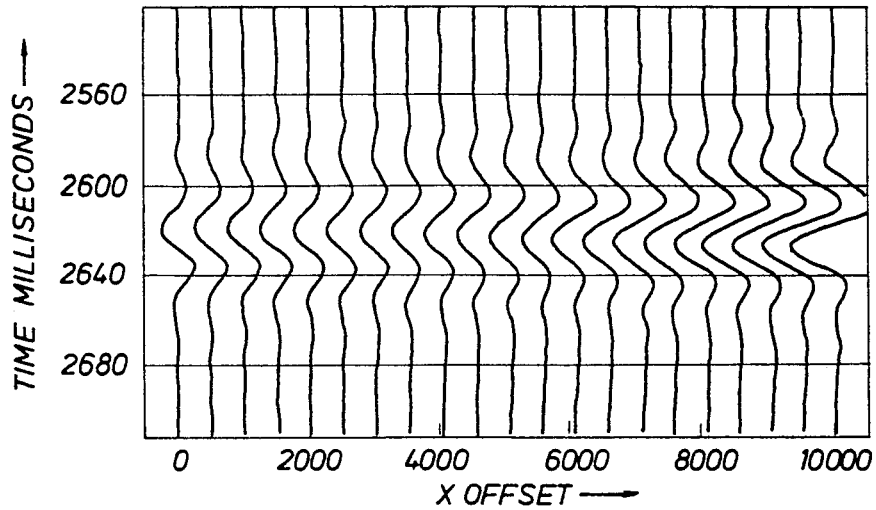
FIG.2C
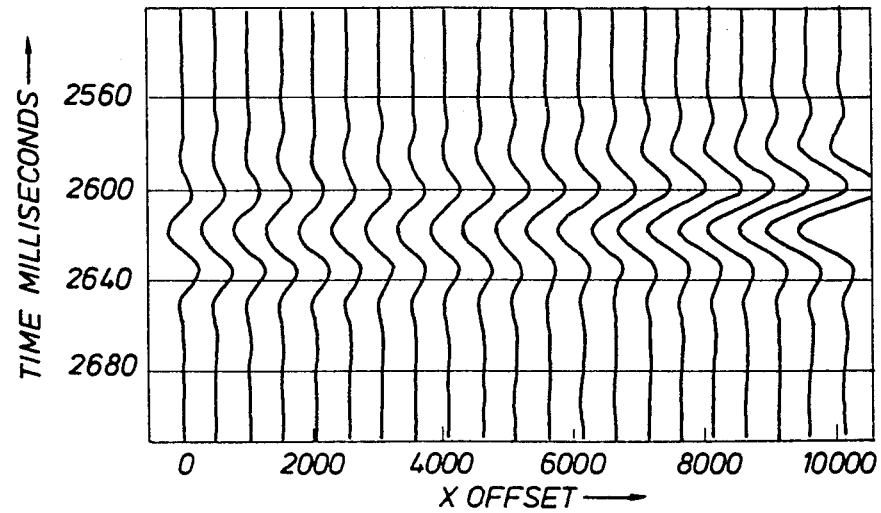
FIG.2D

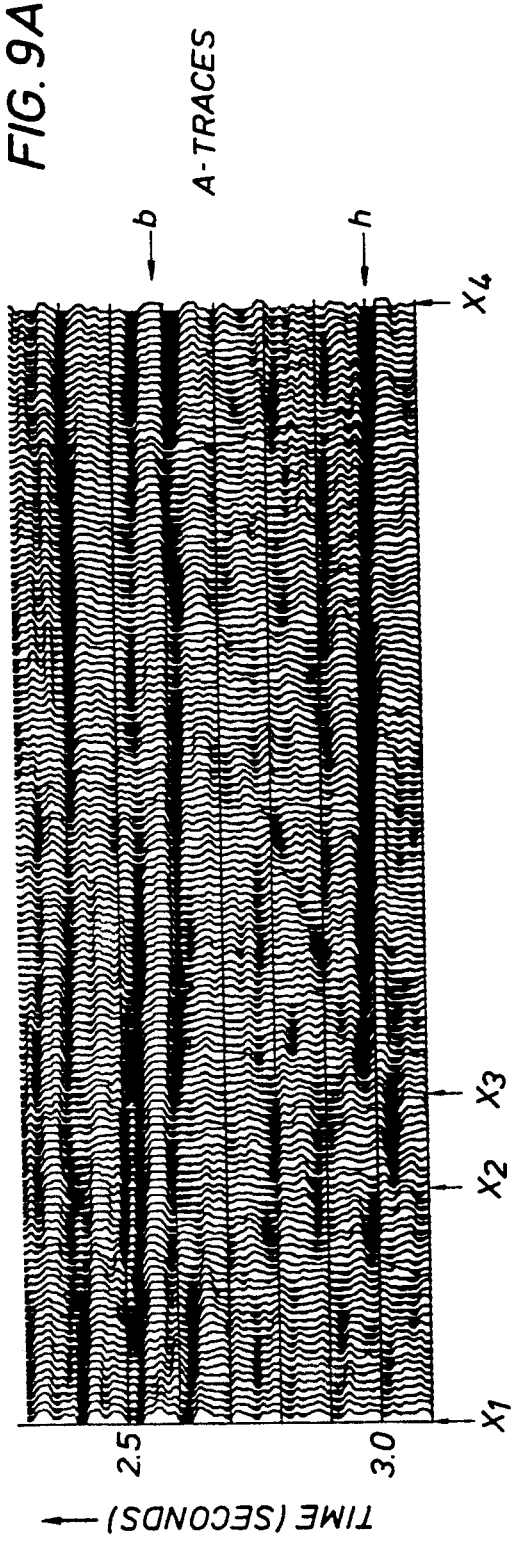
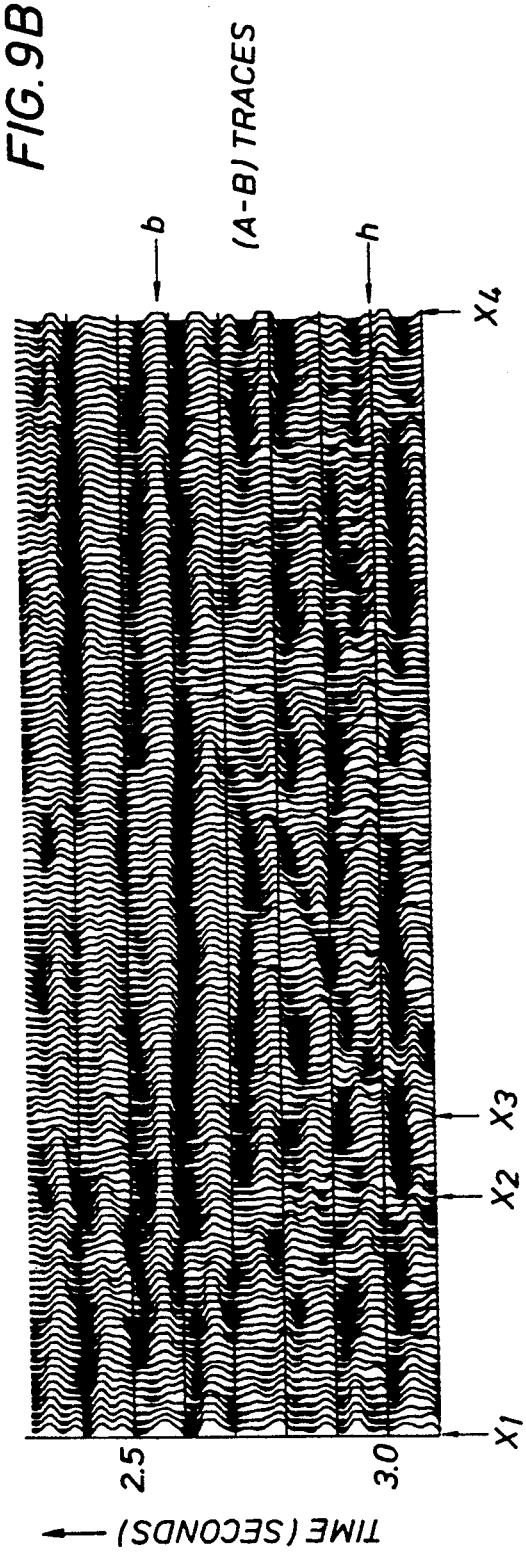

METHODS FOR PROCESSING SEISMIC DATA

BACKGROUND OF THE INVENTION

The present invention relates to exploration seismic reflection surveying and more particularly, relates to the processing of exploration seismic reflection data to enhance information in seismic signals reflected from contrasts or differences in elastic constants or densities in the subsurface of the earth.

The methods of the present invention which are described herein are generally discussed in terms of compressional-wave (PP) seismic data acquisition and processing, which is the most common form of seismic data used in exploration seismology. However, it should be understood that these methods are equally applicable to shear-wave seismic data.

Conventional land or marine seismic acquisition techniques involve the use of an appropriate source to generate seismic energy and a set of receivers, spread out along or near the surface of the earth on land or at or near the water surface or water bottom in a water covered area, to detect any reflected seismic signals due to seismic energy stricking subsurface geologic boundaries. These signals are recorded as a function of time and subsequent processing of these time varying signals, i.e. seismic "traces" or seismic data, is designed to reconstruct an appropriate image of the geologic boundaries of the subsurface and to obtain information about the subsurface materials. In simplistic terms, this conventional process has a seismic wave, from a source of seismic energy, travelling down into the earth, reflecting from a particular geologic interface (i.e. a change or contrast in elastic constants and/or densities), and returning to the surface, where it may be detected by an appropriate receiver.

If the seismic-wave velocity is known as a function of depth and lateral position, and if the position and dip of a plane geologic interface are known, the time for the wave to travel down to that particular reflecting interface and reflect back to the surface can be computed for any source and receiver locations. This two-way travel time are usually described by a function $t(X,Z)$, where $Z$ is the depth to the reflecting interface (contrast in elastic constants or density) and $X$ is the horizontal distance (offset) between source and receiver.

If the elastic constants and densities of the materials above and below a planar reflecting interface are known, then the reflection coefficient may be computed. This reflection coefficient is the ratio of reflected amplitude to incident amplitude and will depend on the angle of incidence at the reflecting interface. The angle of incidence, $\theta$, is the angle between the ray normal to the incident downgoing wavefront and a line normal to the interface; as is well known, the incident and reflected rays will be in a plane normal to the interface. This angle of incidence increases with increasing offset $X$. The reflection coefficient for a compressional wave from a particular interface will be designated by the function $R_P(\theta)$, where the angle $\theta$ may be related to the offset distance $X$ and depth of reflector $Z$ by raytracing if the compressional-wave velocity at all points in the earth is known; this velocity information, or a reasonable approximation thereto, is referred to as a "velocity model". For a given reflector, the reflection angle, $\theta$, and offset, $X$, are geometrically related, so any discussions herein in terms of dependence upon offset (offset dependence) is equivalent to dependence upon reflection angle (angular dependence). The angular (or offset) dependence of reflection amplitude may be computed exactly for a point source and plane reflector, however in most practical cases it may be approximated adequately by plane-wave reflection coefficients (reflection coefficients for an incident plane wave) which are easily calculated using expressions derived from the results of Zoeppritz (see for example, Bull Seismol. Soc. Am., Vol. 66, 1976, pp. 1881-1885, Young, G. B. and Braile, L. W.). For a compressional-wave reflection from a planar interface between two media having a small contrast (i.e., with the medium containing the incident and reflected waves having a compressional velocity $V_P$, a shear velocity $V_S$, and a density $\rho$, and the other medium having a compressional velocity of $V_P+dV_P$, a shear velocity $V_S+dV_S$, and a density $\rho+d\rho$, and where $dV_P/V_P$, $dV_S/V_S$, and $d\rho/\rho$ are small compared to one), the offset (or reflection angle) dependence of reflection amplitude may be described for angles of incidence less than the critical angle by an expansion of the form, $$R_P(\theta) = R_P(O) + K \sin^2(\theta) + L \sin^4(\theta) + \ldots \quad (1)$$

For the discussion herein, the angles of incidence are limited to angles such that the terms of the order of $\sin^4(\theta)$ and higher are negligible. In Equation (1), $R_P(O)$ is the normal incidence ($\theta=O$) reflection coefficient; $R_P(O)$ depends only on the densities and compressional velocities of the two media. K is a constant, which also depends on the elastic properties and densities of the media. The relationship of K to the elastic properties and densities may be expressed in a number of ways. One particularly simple expression which relates K to the contrasts in shear velocities, compressional velocities, and densities is $$K = R_\alpha - 4(V_S/V_P)^2(2R_\beta + R_\rho), \quad (2)$$

where $$R_\alpha = dV_P/(2V_P + dV_P), \quad (2a)$$

$$R_\beta = dV_S/(2V_S + dV_S), \text{ and} \quad (2b)$$

$$R_\rho = d\rho/(2\rho + d\rho). \quad (2c)$$

Also, in terms of these same coefficients, the normal incidence or zero offset reflection coefficients are given exactly by, $$R_P(O) = \frac{R_\alpha + R_\rho}{1 + R_\alpha R_\rho}, \text{ and} \quad (2d)$$

$$R_S(O) = \frac{R_\beta + R_\rho}{1 + R_\beta R_\rho}. \quad (2e)$$

For sufficiently small values of $R_\alpha$, $R_\beta$, and $R_\rho$, equations 2d and 2e may be approximated as, $$R_P(O) = R_\alpha + R_\rho, \text{ and} \quad (2f)$$

$$R_S(O) = R_\beta + R_\rho. \quad (2g)$$

Thus, measurement of the normal incidence compressional-wave reflection coefficient, $R_P(O)$, gives information about the densities and compressional velocities, while measurement of the offset dependence constant K can provide information about the densities and shear velocities of the media. The formulas given above are for small contrasts in the elastic properties and densities above and below the planar interface; of course, more general theoretical relations may be used. Similar relationships are well known for the offset dependence of shear-wave reflection coefficients, although the particular form for such shear-wave equations that are analogous to Equation 2 is quite different.

There are a number of geologic questions important to exploration for hydrocarbons which can be answered by acquiring a knowledge of both the compressional- and shear-wave properties of the subsurface materials. For instance, these materials are generally porous with various fluids filling the pore space. The compressional velocity of a seismic wave in such media depends strongly on the rock matrix properties as well as those of the pore fluid. On the other hand, shear-wave velocities depend strongly on the rock matrix but only slightly on the pore fluid. Thus, detailed study of both the compressional and shear properties of the media provides an opportunity to characterize any changes in seismic response as being due to changes in fluid content (e.g. from brine to oil, or oil to gas) or changes in the rock matrix (e.g. from sandstone to shale or a change in porosity). The ratio of $V_P$ to $V_S$ is often a useful diagnostic feature of such changes. It should be noted that, even without lateral variation, in many cases the recognition of fluid content or rock type may be possible with an accurate knowledge of the compressional and shear properties at a single location. Distinguishing between fluid effects and lithology effects, and detecting different porosity and lithology types are of vital exploration interest and the desire to make such distinctions has engendered significant effort in the measurement and interpretation of shear properties in addition to the information concerning compressional properties traditionally inferred from conventional PP reflection prospecting.

It is generally the objective of seismic exploration to generate seismic energy, make measurements of the reflection amplitude of this energy at various offsets and for various times, and then, by employing various processing steps on this seismic data, to deduce the geometry as well as some of the elastic properties and densities of the materials of the earth through which the seismic energy has propagated and from which it has been reflected.

One such processing method which results in some knowledge of a velocity model (that is the velocity of seismic waves as a function of Z) is conventional moveout velocity analysis. This velocity model may then be used for dynamic correction followed by stacking the corrected seismic data, as described below.

A seismic reflection from an interface will arrive at a receiver after a two-way travel time, denoted and used herein as, t(X), where X is defined and used herein as the distance between the source and the receiver, or "offset" distance. This "moveout time" t(X) may be used to "dynamically correct" seismic data acquired at an offset distance X so that a reflection is adjusted in time to appear as if it had been acquired at zero offset, i.e. X=0. Conventional "stacking" is accomplished by summing or averaging such dynamically corrected data.

For seismic data where the downward and upward propagating wave types are the same, either compressional or shear, the square of this moveout time has a well known expansion about X=0:

$$t^2(X) = t_0^2 + a_2 X^2 + a_4 X^4 + \ldots, \quad (3)$$

where the coefficients $a_2$, $a_4$, $a_6$, etc. . . . are known functions of the propagation velocity at each depth and $t_0$ is the X=0 (zero offset) two-way travel time. The propagation velocity at a particular depth is known as the "interval" velocity at that depth. Experience with compressional-wave data has indicated that in most areas the P-wave vertical velocity distributions are such that, within the offset range (X<Z) and frequency range (5-100 Hz) normally considered in exploration seismology, terms of higher power than $X^2$ are small and for many purposes may be ignored. Ignoring the higher order terms is equivalent to approximating the stratified earth with a single horizontal layer having an "effective" velocity, $V_e$. For this simplified case Equation 3 reduces to the "normal hyperbolic moveout" expression $$t^2(X) = t_0^2 + X^2/V_e^2, \quad (4)$$

where $$V_e^2 = \frac{2 \int V(Z) dZ}{t_0}, \quad (4a)$$

and $$t_0 = 2 \int [dZ/V(Z)]. \quad (4b)$$

For the simplistic discussions hereinabove, the earth model is assumed to be one for which velocities may vary with depth, but not laterally; however, the methods of the present invention may be applied in more general cases. For example, this model and analysis is also appropriate for reflections from dipping reflectors as long as the data is gathered by common midpoint (CMP) between source and receiver pairs (as more fully described below), and the degree of dip is not severe, and the reflectors are laterally continuous. If these assumptions are not met, other conventional processing steps, such as migration, may be required, although they are not described herein. For a dipping reflector, the interpretation of the coefficient $a_2$ of equation 3 as the square of the reciprocal of effective velocity must be modified to include the cosine of the dip angle. For this case equation 4 becomes:

$$t^2(X) = t_0^2 + \frac{X^2}{(V_e/\cos\alpha)^2}, \quad (4')$$

where $\alpha$ is the dip angle.

Conventional processing of compressional-wave data uses data collected with many sources and many receivers and gathers the data by the common midpoint (CMP) technique, as illustrated in FIG. 1A. Traces with a common "midpoint" between the source and receiver are collected or gathered at a surface gather point. For example, in FIG. 1A, $S_1$ and $R_1$ are the source and receiver pair for the first trace and have a midpoint at the surface point (0). FIG. 1B depicts the corresponding hyperbolic moveout of such data (where the numbers used correspond to the subscripts used in FIG. 1A) and FIG. 1C depicts the corresponding variation of reflection coefficient with offset for such a case. That is, after the data have been acquired for a number of sequential source positions the traces for various source-receiver combinations are sorted or gathered into different midpoint groups which have the same or "common" surface location of the "midpoint" between the source and receiver positions (as depicted in FIG. 1A). This sorted or gathered midpoint data is then analyzed or processed (via equations 4) to determine effective velocities $V_e$, also called normal moveout velocities, for reflections from various depths, i.e. various values of $t_o$. One method is to determine for each $t_o$ a value of $V_e$ which provides dynamic corrections which maximize the resultant amplitudes of the "stacked" data in a time gate around $t_o$. Many methods for moveout velocity analysis and dynamic correction of compressional (PP) and shear (SS) seismic data have been in use since the late 1960's, as described for instance by Tanner and Koehler ("Velocity Spectra-Digital Computer Derivation And Application Of Velocity Functions", Geophysics 34, pp. 859-881 (1969) Tanner, M. T. and Koehler, F.).

The original basis for CMP processing is the fact that each trace in a gather images (or consists of reflections from) approximately the same subsurface points, and, when properly adjusted for differing path lengths, the set of corrected traces may be averaged to give an enhanced picture of the reflection response of the earth below that CMP surface location by emphasizing true primary reflections and discriminating against multiple reflections and other undesirable noise. It is usually assumed that the "stacked" trace represents the normal incidence (zero-offset) response of the earth. While this procedure has been very effective in improving signal-to-noise ratios for seismic data in many areas, it ignores the fact that reflection amplitudes vary as a function of offset and that the stacked trace is not equivalent to a normal incidence trace.

More recently, methods have been described for measuring and interpreting the variation with offset of the reflection amplitude from a given subsurface interface. Techniques which are taught for example in U.S. Pat. No. 4,562,558 to Ostrander, 4,573,148 to Herkenhoff et al, 4,570,246 to Herkenhoff et al, 4,316,267 to Ostrander, 4,316,268 to Ostrander, and 4,534,019 to Wiggins et al explicitly describe methods for measuring and interpreting amplitude variation with offset. Since reflections appear at increasing times at increasing offsets, all these newer methods also require a technique for identifying the time at which a given reflection appears at each offset. Various conventional methods have been used for identifying these times in the above-noted patents, as well as in other publications on the subject. One method simply proposes following a particular trace feature, say a maximum amplitude as it moves out with offset. A more common method utilizes formulas like equation (4) with an effective velocity determined by conventional means (i.e. ignoring amplitude versus offset) as described in the reference noted hereinabove.

Applicants have discovered that in many cases neither the conventional technique of event moveout determination by conventional velocity analysis, or the conventional technique of following the peak amplitude (or other feature) of an event as a function of offset is of sufficient accuracy for use in studying reflection coefficient variation with offset, specifically because these techniques do not properly account for the effects on moveout determination of amplitude variation with offset. Examples, where these conventional techniques fail, include situations where the reflection amplitude varies with offset in such an extreme manner that the reflection amplitude changes sign, going from positive values to zero and then to negative values over the ranges of offsets being considered. Another case is described later herein, where the varying offset dependence of closely spaced reflectors can have the appearance of a single reflector convolved with a wavelet which changes with offset in a spurious manner. Thus, a method for determining the effective velocity of seismic events more accurately by specifically including the effects of amplitude variations with offset is needed. Moreover, such a method could simultaneously determine a more accurate measure of amplitude variation with offset and normal incidence reflection amplitude.

These and other limitations and disadvantages of the prior art are overcome by the present invention, however, and improved methods are provided for determining from seismic data normal moveout velocities and associated dynamic corrections that preserve amplitude versus offset information to provide better estimates of effective velocities, the normal incidence reflection amplitudes, and the offset dependence of the reflection amplitudes.

SUMMARY OF THE INVENTION

In a preferred embodiment of the present invention seismic data that has been acquired employing a plurality of known source and receiver locations is processed to provide simultaneously determined and self-consistent representations of a) zero-offset reflection amplitudes, b) reflection amplitude dependence on offset, and c) effective velocities, all determined from the seismic data. The methods of the present invention employ amplitude versus offset information during such processing, to provide more correct velocity and dynamic correction information than is available from conventional techniques and to provide simultaneous quantitative estimates of amplitude variation with offset.

It is an object of the present invention to provide a method for performing normal moveout corrections which allows for determination from seismic data of true reflection amplitudes at zero-offset or normal incidence.

It is an object of the present invention to provide a method for performing normal moveout corrections which allows for determination from seismic data of true reflection amplitude dependence on offset.

It is an object of the present invention to provide a method for performing normal moveout corrections which allows for determination from seismic data of true reflection amplitudes at zero-offset and true amplitude dependence on offset.

It is an object of the present invention to provide methods for performing moveout velocity analysis that include consideration of appropriate amplitude variation with offset.

It is an object of the present invention to provide methods for more accurately determining effective velocities, from which more accurate interval velocities may be derived.

It is an object of the present invention to provide methods for constructing more accurate and more easily interpreted seismic sections.

It is an object of the present invention to accurately determine the normal moveout velocity, normal incidence reflection coefficients, and the offset dependence of the reflection coefficients, which may then be used to provide information about the elastic constants and densities of the subsurface materials which have caused the reflection of seismic signals.

It is an object of the present invention to provide a method for processing seismic data, comprising, simultaneously determining the moveout velocity, normal incidence reflection amplitude, and offset dependence of reflection amplitude from said data.

It is an object of the present invention to provide a method for processing seismic data, comprising, calculating from a known reference velocity function effective reflection angles for various two-way travel times and offsets of said data, determining from said data and effective reflection angles for a trial moveout velocity function, fitting coefficients for a preselected offset dependence function which expressly accounts for offset dependence of reflection amplitudes, repeating said determining of said fitting coefficients for a plurality of said trial moveout velocity functions, and selecting for various normal incidence two-way travel times appropriate moveout velocities and fitting coefficients from said data.

It is an object of the present invention to provide a method for determining properties of subsurface materials, comprising, generating seismic energy on or near the surface of the earth, measuring on or near the surface seismic signals resulting from said seismic energy reflected from interfaces, determining from said measured seismic signals optimized moveout velocities, normal incidence reflection amplitudes, and angular dependencies of reflection amplitudes, and determining elastic properties and densities of said subsurface materials from said moveout velocities, normal incidence reflection amplitudes, and offset dependencies of reflection amplitudes.

These and other objects and advantages of the present invention will become apparent from the following detailed description, wherein reference is made to the Figures in the accompanying drawings.

BRIEF DESCRIPTION OF THE DRAWINGS

FIGS. 2A-2D depict a model of a layered earth, associated reflection coefficients at various offsets, and two synthetic seismograms derived from this model.

FIGS. 9A and 9B depict, respectively, A(t) and A(t)−B(t) panels for real seismic data recorded along a particular line of common midpoints.

DETAILED DESCRIPTION OF THE INVENTION

Figure 1A:
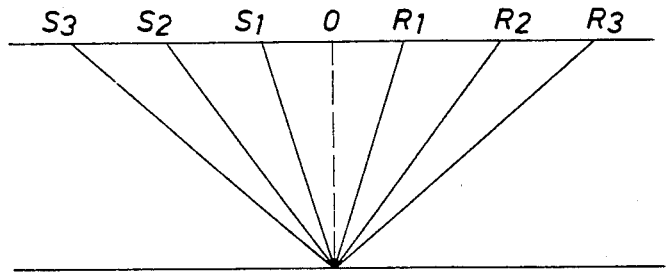
FIGS. 1A, 1B, and 1C depict conventional seismic common midpoint acquisition geometry, the hyperbolic moveout of reflection data obtained, and the variation of reflection coefficient with offset, respectively.
Figure 1B:
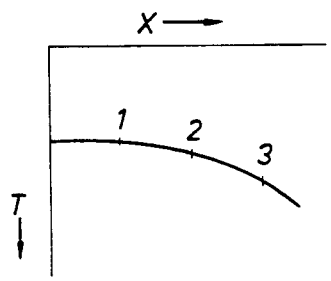
Figure 1C:
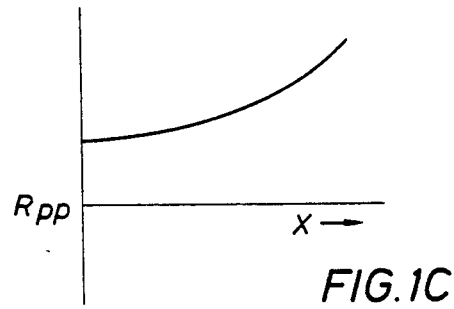

The present invention provides methods for processing conventionally acquired seismic field data. These methods include normal moveout velocity analysis, including appropriate offset dependence, and dynamic correction of the data. The velocity analysis uses offset dependence parameters determined simultaneously from the data. Additional processing steps may be performed as necessary or desired before or after any of these steps. For example, the data may also be corrected for statics or otherwise manipulated to enhance signals.

The methods of the present invention which are described herein are generally discussed in terms of compressional-wave (PP) seismic data acquisition and processing, which is the most common form of seismic data used in exploration seismology. It should be clearly understood that these methods are equally applicable to shear-wave seismic data acquired using an appropriate shear source and appropriate shear motion detectors. Other than the particular acquisition techniques involved and the techniques for final interpretation of seismic attributes, the only changes necessary for the application to shear data would be to replace the discussions of the compressional-wave moveout and interval velocities with appropriate shear-wave moveout and interval velocities. While the measurement of normal moveout velocities, normal incidence reflection amplitudes, and the offset dependence of the reflection amplitudes, may be accomplished in the same manner for each of these modes of seismic propagation, the relation of these measurements to the elastic properties and densities of the medium will not be the same. The reflection coefficients for these various modes have well known but quite different dependences on the elastic constants and densities of the reflecting materials.

The following phrases or expressions used herein, are defined as follows: "Amplitude versus offset (AVO)" means the phenomenon of seismic signal amplitude varying with source-receiver offset; such variation is caused by angular dependence of reflection coefficients, wavefront divergence, acquisition techniques, absorption, etc.; "Offset dependence of reflection amplitude" means that part of AVO due specifically to reflection coefficient variation with offset; and "Angular dependence of reflection amplitude" or "Angular dependence of reflection coefficients" means the variation of amplitude or reflection coefficient with angle of incidence, an effect which may be deduced from AVO by various processing and measurement steps along with raytracing to relate reflection angle to source-receiver offset. The angular dependence of the reflection coefficient is ultimately required for determining elastic constants and densities of the materials involved in reflections. All of these expressions are related and in many statements referring to a common property of the three terms they may be used interchangeably. Further, the following terms are also used as follows herein: "Normal incidence" means zero offset (X=0) for PP, and SS data; "PP" means a downgoing and upcoming compressional wave, with particle motion parallel to direction of propagation; and "SS" means a downgoing and upcoming shear wave, with particle motion perpendicular to the direction of propagation. Also, note that for notational convenience the two-way travel time at zero offset, defined hereinbefore as $t_o$, is hereinafter denoted as t.

Referring now to FIGS. 2, it may be seen that conventional moveout velocity analysis may result in erroneous velocity estimates, improper dynamic correction, and incorrect amplitude interpretation of particular seismic events. FIG. 2A represents a simple model of two 50 foot intervals of a sand layer, one gas filled and one brine filled, embedded in shale at a depth of 10,000 feet. Realistic velocities and densities were used in Zoeppritz's equations to determine reflection coefficients for plane waves at the angles of incidence at the reflectors corresponding to various source-receiver separations, X. The reflections from the three interfaces were found to be separated by two-way travel times on the order of 10 msec for X=0; two-way travel time separations gradually decrease as X increases. FIG. 2B depicts the offset dependence of the reflection coefficient for each individual reflector or interface. The plotting symbols correspond to the symbols identifying the interfaces in FIG. 2A.

The displays in FIGS. 2C and 2D show a number of synthetic seismogram traces, computed for various source-receiver offset distances. The traces are plotted vertically with time increasing downward along the vertical axis; they are spaced along the horizontal axis at distances proportional to the offset. The synthetic seismograms represent the expected seismometer responses to earth motion with motion in the direction defined as positive representing a trace deflection to the right. A given motion of the earth would produce the same amount of deflection in each synthetic trace.

Each trace in the synthetic seismograms depicted in FIGS. 2C and 2D was constructed by convolving a waveform with a reflectivity function made up of three impulses (one for each interface). The amplitudes of the impulses for the plane-wave reflection coefficients for the offset indicated for the trace, and the uncorrected times at which they were posted are the travel times of a compressional wave from the source to the reflector and then to the receiver at the offset indicated. Note that for the waveform chosen, which represents a realistic seismic frequency range, the impulses are not resolved as separate events.

FIG. 2C depicts the synthetic traces dynamically corrected with the correct moveout, or effective velocity, associated with the reflection from each interface at this depth. The correct velocity value is computed from the model. FIG. 2D depicts the synthetic traces dynamically corrected with a moveout velocity function chosen by conventional moveout velocity analysis to maximize the correlation of the dynamically corrected traces. Although the correct effective velocity for the middle reflector is 7794 (fps), the conventional moveout velocity analysis provides a value of 7700 (fps). Thus, the conventional moveout velocity analysis provides an erroneous estimate of the true effective velocity.

Note that a measurement of AVO made at a time of 2600 milliseconds on FIG. 2D would give a very different result than a similar measurement made on FIG. 2C where correct effective velocities were used. That is, at an offset, X, of zero on both figures, the same maximum right deflection occurs at the timing line while at an offset, X, of 10,000 the correct amplitude at the timing line in FIG. 2C is much smaller than the amplitude seen in FIG. 2D.

Before giving a detailed description of the present invention's method of velocity analysis, a detailed description of conventional velocity analysis is provided. Conventional velocity analysis involves a dynamic correction process using an assumed trial moveout velocity function $V_e(t)$, followed by a measurement of the deviation of the corrected data from an assumed ideal situation in which properly corrected reflections have the same amplitude and shape for all offsets (which is the same as maximizing the amplitude of the stacked trace or maximizing the correlation of all the dynamically corrected traces). The measurement of the deviation may be done on a (time) sample by (time) sample basis, although normally some averaging over adjacent times is applied. For a particular assumed $V_e(t)$, a "quality of fit coefficient", $E[V_e(t)]$, which depends on the squared differences between the trial corrected data and the ideal, may be computed and then plotted versus velocity and two-way travel time. Note that $E[V_e(t)]$ is given by, $$E[V_e(t)] = 1 - \left[ \frac{\sum_{t'} \min_{C} \sum_{X} (C(t') - S(t',X))^2}{\sum_{t'} \sum_{X} S(t,X)^2} \right] \tag{5}$$

the summation over X is over all offsets, the summation of t' is over samples in the time window between $t - \Delta t$ and $t + \Delta t$, $S(t,X)$ is a seismic panel dynamically corrected for the trial velocity $V_e(t)$, and "min" indicates that $C'(t')$ is chosen to minimize the sum of the squared error differences for each time t'. The step of computing and plotting the quality of fit coefficient $E[V_e(t)]$ is repeated for various $V_e(t)$ functions to determine what velocities provide the largest quality of fit coefficient at a given time, t. (Of course, it also possible to only employ the bracketed term in equation 5 and have quality of fit coefficients that are minimized, i.e. most nearly approach zero.)

For the hereinabove described case, the sum of squared errors is minimized for a particular t' when $$C' = (1/N_X) \sum_{X} S(t,X),$$

where $N_X$ is the number of offsets with valid data, and equation 5, reduces to $$E[V_e(t)] = \frac{\sum_{t'} \frac{1}{N_X} [\sum_{X} S(t',X)]^2}{\sum_{t'} \sum_{X} S^2(t',X)}. \tag{5a}$$

Equation 5a is also an expression for the relative power of the stacked trace and also the correlation of all the dynamically corrected traces in a time window about t. Thus, maximizing the quality of fit coefficient also yields the maximum relative power and maximum correlation.

In order to include the effect of amplitude variation with offset in the methods of the present invention for velocity analysis such amplitude variation must be characterized. As noted hereinbefore, the general characteristics of offset dependence of reflection amplitudes have been found to be adequately approximated for a given interface as:

$$R_P(\theta) = R_P(O) + K \sin^2(\theta) \tag{6}$$

where $R_P(O)$ is the normal incidence ($\theta=0$) reflection coefficient and K is a constant, and both $R_P(O)$ and K depend on the elastic properties and densities of the two media, as described in equations 2.

Although the particular term used for including the offset dependence of reflection amplitude is preferably $\sin^2(\theta)$, other terms may be employed in the methods of the present invention. Alternative approximation expressions such as, $$R_P(\theta)=R_P(O)+K' \tan^2(\theta)$$

or $$R_P(\theta)=R_P(O)+K''X^2$$

may work nearly as well in fitting the offset dependence observed in most data over a limited offset range. The approximation expression employed to describe the offset dependence will have some effect on how large an offset range may be used in the processing and how large the reflection contrast may be before the approximation becomes inadequate. The choice of offset variable (i.e., source-receiver separation, reflection angle, injection/emergence angle, etc.) has little effect on the quality of fit to the data, but does affect how the measurement of the offset dependence can be interpreted in terms of the elastic properties and densities. A correct interpretation requires the use of the correct reflection angle which can be determined from the known offset distance X and travel time t if the exact interval velocity model is known. Since this velocity model is seldom known exactly, approximate velocities, and therefore approximate reflection angles are often determined from the moveout velocity analysis. However, the moveout velocity determination and the normal incidence reflection coefficient determination are both insensitive to the approximation of the reflection angle, as well as to the particular term used for including the offset dependence of the reflection coefficients.

The methods of the present invention substitute a function of the form $A(t)+B(t) \sin^2\theta(X)$ for $C'(t)$ in equation 5, i.e.

$$E[V_e(t)] = 1 - \frac{\underset{t'A,BX}{\Sigma\min\Sigma}[A(t') + B(t') \sin^2\theta(X) - S(t',X)]^2}{\underset{t'X}{\Sigma\Sigma}S(t',X)^2} \quad (7)$$

The "min" values of A and B are time dependent fitting coefficients, with A(t) representing a least-squared-errors estimate of normal incidence (zero-offset) amplitudes and B(t) representing a least-squared-errors measure of the offset dependence of the seismic data for a given $V_e(t)$ function at a time, t. This procedure is repeated for various $V_e(t)$ functions. The $V_e(t)$ for which the quality of fit is maximum at a time t is chosen as the optimum value and the corresponding A(t) and B(t) are similarly called "optimal" values, as described in more detail hereinbelow.

The summations over offsets in equations 5 and 7 are typically limited to a range corresponding to some preselected angle limits or a preselected range of X/Z. The limits serve several purposes and are selected to be compatible with these purposes: 1) frequently these limits are chosen to avoid coherent noises from arrivals other than primary reflections; 2) they avoid "apparent wavelet stretch" introduced by dynamic corrections and due to the convergence of moveout hyperbolas; and 3) they avoid the angles or offsets so large that the seismic energy is critically reflected or the approximate form in equation 6 is not sufficiently accurate. Although items 1) and 2) above are important for conventional analysis, all three purposes are important for the present invention. Range limits are often imposed by "muting" the dynamically corrected data, that is, by setting the seismic amplitudes outside the acceptable range to zero. The muted data are not counted or included in any of the summations over offset or time in all of the previous and following equations described herein.

Minimization of the sum in equation 7 with respect to A(t) and B(t) is a least-squared-error optimization problem. Stating the problem in terms of a "least-squared-error" optimization allows for convenient generalization, for instance, by including various weights based on offset or signal-to-noise ratio. In the least-squared-error method explicitly described herein the weights are taken to be equal. Including more general weights is considered within the scope of the present invention. The solution and the resulting optimal values may be expressed as simple moments of the seismic data, as a function of angle (or equivalently offset). For equation 5 the optimal value of C' may also be written as, $$C'(t)= <S(t,X)>_X, \quad (8)$$

where the following notation ("< >") is employed for moments of the seismic data $$<S(t,X)\sin^n(\theta)>_X = \frac{1}{N_X} \sum_X S(t,X) \sin^n(\theta). \quad (9)$$

Similarly for equation 7, the optimal values of A and B may be written as:

$$A(t) = \frac{<S(t,X)>_X<\sin^4\theta>_X - <S(t,X) \sin^2\theta>_X<\sin^2\theta>_X}{<\sin^4\theta>_X - <\sin^2\theta>_X^2} \quad (10a)$$

$$B(t) = \frac{<S(t,X)\sin^2\theta>_X - <S(t,X)>_X<\sin^2\theta>_X}{<\sin^4\theta>_X - <\sin^2\theta>_X^2} \quad (10b)$$

The angle, $\theta$, in equations 10 is ideally the incident reflection angle at each interface. To convert the offset and travel time of the field data to an actual incident reflection angle requires information about interval velocities, which may not always be known. However, various approximate solutions have proven to be satisfactory. For example, the same functional form, $A+B \sin^2\theta$ holds to order $\sin^2\theta$, whether the angle used is the incident reflection angle or some other angle, $\theta'$, as long as the two angles are related by an expression of the form $$\sin \theta' = E \sin \theta + F \sin^2\theta + \ldots \quad (11)$$

Thus, if an injection angle is employed instead of an incident reflection angle, this expression is still exact in the lowest order of $\theta$ because of Snell's law. Even an average, or effective reflection angle is related to the actual reflection angle by an expression of the form of equation 11.

In practice an effective angle $\theta$ as defined by $$\sin^2\theta = \frac{X^2}{X^2 + [tV_e(t)]^2} \quad (12)$$

may be used for measurement of the offset dependence of reflection amplitude. In this case $V_e(t)$ is a reference effective velocity function which may be refined in an iterative manner during the process of velocity analysis, as described more fully below.

If a more detailed velocity function is available it may be used to relate offset and travel time to reflection angle for use in equations 10. In this case ray tracing through a velocity model may be performed. The methods of the present invention may employ any type of ray-tracing technique. Further, although much of the detailed discussion given herein is couched in terms of velocity models which vary only with depth, the inclusion of lateral velocity variations and dipping reflections in the model through which the ray-tracing occurs is within the scope of the present invention.

From the ray tracing, various values of $\theta$ and $\sin\theta$ (one for each two-way travel time and each offset) may be calculated and stored as a function of the source-receiver offset distance X, and the two-way travel time to the reflector. For purposes of computational economy these values may be calculated for a limited or preselected number of offset and time tie points. The values at these tie points may be interpolated to determine $\sin\theta$ for other offsets and times. An amplitude correction term may also be calculated and stored with the foregoing stored data; this amplitude term represents the calculated change in amplitude due to geometrical spreading of a wave-front for the various raypaths modeled using ray tracing. Injection and emergence angles may also be calculated during the ray tracing and stored for use in additional amplitude corrections, due for instance to array effects and absorption.

The quality of fit coefficient, E, and the normal incidence reflection amplitude estimate, A(t), are both insensitive to the manner in which $\sin^2\theta$ is estimated. The measured offset dependence, B(t), is much more sensitive to this choice but may be corrected at the time of interpretation by modelling with a more accurate interval velocity function measured with well logs or estimated from an appropriate inversion scheme.

The preferred method of the present invention for performing improved moveout velocity analysis initially selects an earth velocity model representative of the area of interest and then employs ray tracing through this model to determine $\sin\theta$ for a plurality of values of offset and travel time. The data may then be corrected for any significant change in amplitude or in shape due to field instrumentation and travel through the model. Examples of such phenomena, are seismometer array effects and inelastic absorption in the earth. The data are also corrected for wavefront spreading amplitude changes as determined during the ray tracing, or by an appropriate, separate ray tracing step.

Using equation 4, the arrival times of the data are then dynamically corrected for each of several trial effective velocity functions and the terms of equations 10 calculated. A(t), B(t), and E(t) are computed using equations 10 and 7, and tables and/or displays of the quality of fit coefficients, E, for each trial effective velocity are made. The effective velocities at the local maxima of the quality of fit coefficients (see for example FIG. 5A) are called "selected velocities" and are chosen as the best or optimum estimate of effective velocities for the times of the maxima, where the estimation process includes changes of signal amplitude and shape with offset. As with conventional velocity analysis, only one maximum is chosen at any value of t and for some values of t no suitable maximum value may be found, which may require interpolation between selected maxima as described later herein.

Additional outputs of this method are the least-squared-error fitting coefficients A(t) and B(t) for such selected velocities. In the sense that a pair of coefficients A(t) and B(t) are calculated for each trial effective velocity function and are determined by the velocity function, the selection of an "optimal" velocity function determines the "optimal" set of coefficients A(t) and B(t); this determination is defined herein as the "simultaneous" determination of the optimal velocity function and the corresponding optimal A(t) and B(t) traces.

Although the methods of the present invention involve calculations in addition to those used in conventional velocity analysis, these methods are not dramatically more costly than conventional velocity analysis and yield A(t) and B(t) traces in addition to improved velocities. However, for determination of the amplitude variation with offset to yield meaningful elastic properties and densities, care must be exercised during trace amplitude adjustment of the data, e.g., avoiding arbitrary gain correction such as automatic gain control (AGC) and making other amplitude corrections as described above.

Optionally, the methods of the present invention may be iterated by using the optimum selected velocities from one iteration as the starting velocity model in a subsequent iteration of the processing steps which will then yield refinements to the earth velocity model and improved estimates of amplitude adjustments, angles ($\theta$), and optimum $V_e(t)$, A(t), and B(t) values.

The steps for implementation of the presently preferred method of the present invention may be summarized as follows:

(1) A reference effective velocity function is used to calculate the relation between $\sin(\theta)$ and X and t either in an approximate form using equation 12 or by ray tracing based on the corresponding interval velocity function. The methods for determining average interval velocities from an effective velocity function are well known. For computational economy these calculations may be performed for a limited number of offset and time tie-points. Later, as needed, these tie-point values may be interpolated to determine $\sin(\theta)$ for other offsets and times.

(2) Seismic data for a CMP gather is preprocessed, if required (frequency filtering, static corrections, amplitude corrections, common offset migration, etc.). Note that although the amplitude correction which is commonly applied in conventional moveout velocity analysis is a short gate automatic gain control (AGC) designed to make the data fit as well as possible the conventional model assumptions (constant wavelet amplitude for any offset), the amplitude adjustment applied for the methods of the present invention should not involve AGC but includes a wavefront spreading correction as determined by ray tracing using the same velocity function as described in step (1), as well as corrections for known or estimated channel sensitivities, source strengths and receiver coupling variations.

Corrections for array effects and absorption may be determined using the ray tracing results and should also be included in the amplitude adjustment if they are significant.

(3) For each trial effective velocity function the data is dynamically corrected in the same manner as in conventional moveout analysis. For a conventional moveout analysis two sums are computed for each time sample:

$$\frac{1}{N_X} \sum_X S(t,X), \text{ and} \quad (14a)$$

$$\frac{1}{N_X} \sum_X S(t,X)^2. \quad (14b)$$

For the method of the present invention three additional sums are computed:

$$\frac{1}{N_X} \sum_X \sin^2(\theta(X)) \text{ and} \quad (14c)$$

$$\frac{1}{N_X} \sum_X \sin^4(\theta(X)), \quad (14d)$$

which depend upon the offsets (i.e. acquisition geometry) used, but not the data, and $$\frac{1}{N_X} \sum_X S(t,X) \sin^2(\theta(X)), \quad (14e)$$

which does depend upon the data.

(4) Finally the least-squared-error fitting coefficients A(t), B(t) and the quality of fit coefficient E(t) are computed using the sums (14a–14e) in equations 7, 9, and 10, Tables and/or displays of the quality of fit coefficients are made for each velocity function and time sample and then local maxima of these fit coefficients may be picked as in conventional velocity analysis. A velocity function may then be selected to pass through these picked maxima, and is referred to as the "optimal" velocity function.

(5) Additional results of this method are the least-squared-error fitting coefficient traces A(t) and B(t). For each trial velocity function one A(t) and one B(t) trace are determined. These traces may be used to interpolate optimal A(t) and B(t) traces after the optimal velocity function has been determined, or optimal A(t) and B(t) traces may be recalculated from the optimal velocity function.

(6) The optimal A(t) and B(t) traces may then be considered, either individually or in combination, as characteristic attributes of the earth and these attributes may be displayed and interpreted by conventional or other methods. For example, the traces provide information about elastic properties and densities which may be interpreted in terms of lithology, fluid content, or other geologically significant features.

Figure 3:
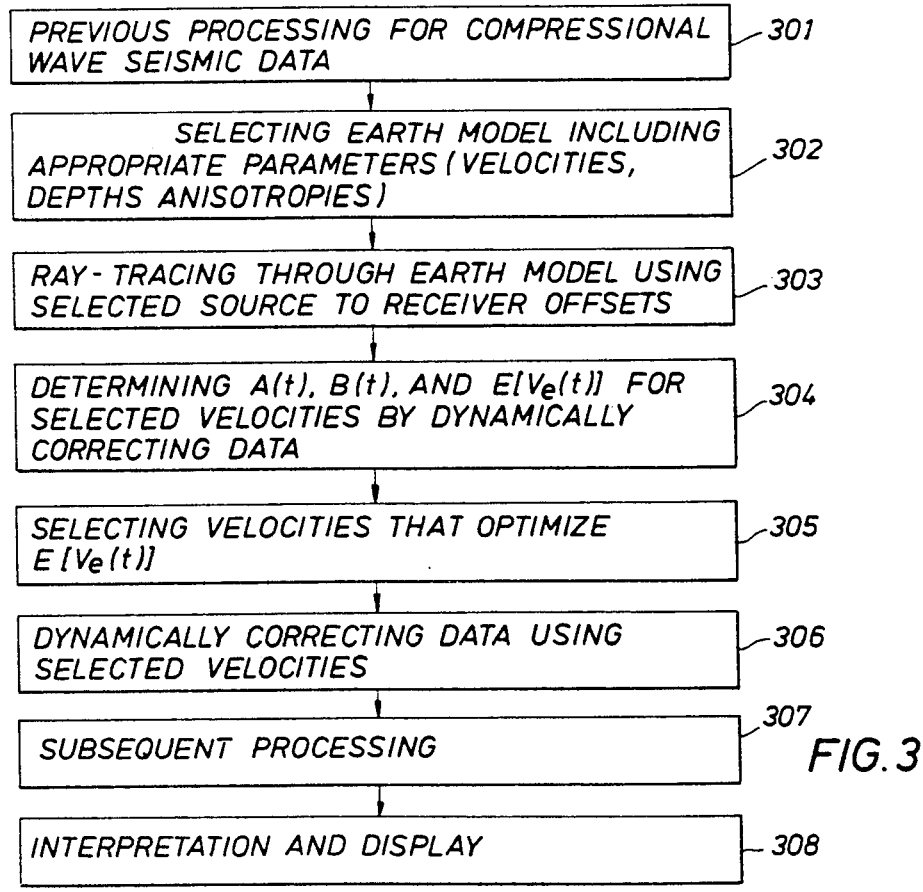
FIG. 3 depicts a simplified flow chart of the processing steps of a method of the present invention.

The basic steps of the preferred method for processing gathered data to estimate a moveout velocity function, a normal incidence trace, and an offset dependence trace may be briefly summarized by referring to FIG. 3. As noted in FIG. 3, there may be previous processing steps before initiation of the method of the present invention (block 301), preferably including a gather based on common source-receiver midpoint or common reflection point, and appropriate amplitude corrections for known effects. The method initially selects an earth model that includes a velocity model based on known or estimated parameters (block 302). This initial velocity model is referred to as a "reference" velocity model. Raytracing is performed through the reference model to determine $\theta$ and $\sin^2\theta$ for various offsets and travel times block 303). The seismic reflection data from the area of interest is dynamically corrected for each of a plurality of trial moveout velocity functions (block 304). Fitting coefficient traces A(t) and B(t) are determined for each zero offset travel time by least-squared-error fitting the seismic amplitudes in the data at that time to a form, which is preferably $A+B \sin^2\theta$ (block 304). A quality of fit coefficient is calculated (block 304). An "optimal" moveout velocity function is selected that interpolates between the velocities corresponding to maxima of the quality of fit coefficient (block 305). The optimal normal incidence trace A(t) and offset dependence trace B(t) may then be determined by interpolation or by repeating the dynamic correction process with the optimal moveout velocity function.

This process may be repeated for each CMP location along a seismic line to provide a display of A(t) and B(t) traces, or combinations thereof, at a plurality of CMP locations, as shown in FIG. 9, and discussed later herein. Frequently, for computation economy, the optimal moveout velocity function may not be determined at every CMP point and for such a case dynamic correction and A(t) and B(t) trace estimation at intermediate CMP locations is accomplished with a moveout velocity function interpolated between the optimal functions determined at adjacent CMP locations.

Optionally, subsequent processing steps may or may not be performed (block 307); these steps may include several iterations of the foregoing process, using the optimal moveout velocity selected in the latest iteration to determine an improved reference model for the next iteration. Thus, it may be seen that the present invention provides methods for processing seismic data that simultaneously determines by an optimization process the moveout velocity, normal incidence reflection amplitude, and angular dependence of reflection amplitude from the seismic data.

The optimal A(t) and B(t) traces may then be considered, either individually or in combination, as characteristic attributes of the earth and these attributes may be displayed and interpreted by conventional or other methods (block 308). For example, the traces provide information about elastic properties and densities which may be interpreted in terms of lithology, fluid content, or other geologically significant features.

To illustrate the effectiveness of the methods of the present invention a synthetic data example will be considered. In the example, synthetic seismogram traces for various values of X were computed for an earth model in which velocity and density vary only with Z. The computation used realistic estimates of vertical variation in $V_P$, $V_S$, and density taken from actual well logs and a wavelet estimated from conventional seismic data. Angles of incidence for each time and X were computed by ray tracing and the reflection coefficient for each time and X was computed from the Zoeppritz equation for the appropriate angle of incidence. The wavelet and the reflection coefficients were then convolved to determine the synthetic trace at each time and for each X.

Figure 4:
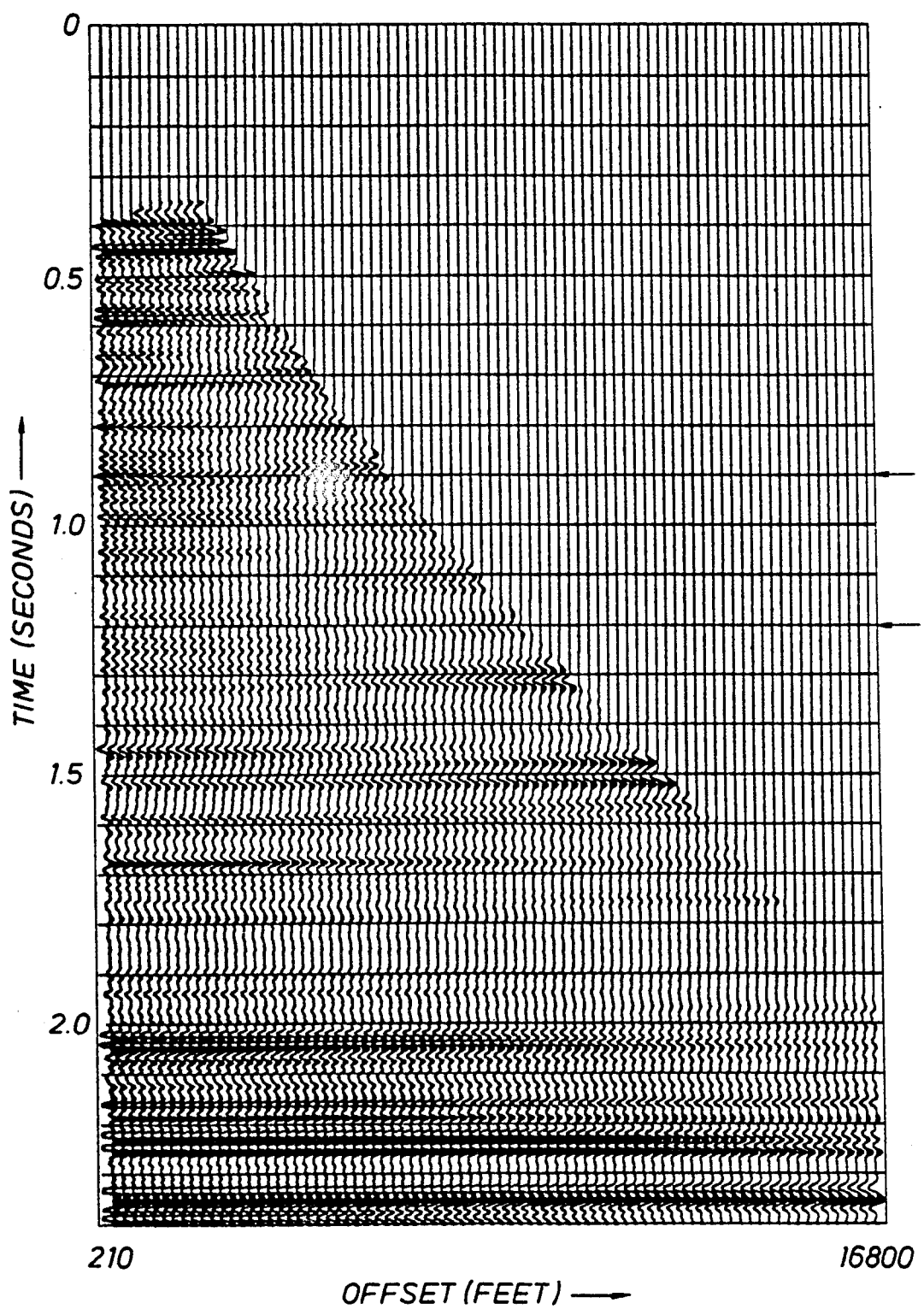
FIG. 4 depicts synthetic common midpoint reflection data dynamically corrected with correct velocities.

FIG. 4 depicts this synthetic data dynamically corrected with the true effective velocity computed from the model. It can be seen, for example, between two-way travel times of 0.9 to 1.2 seconds in FIG. 4, that the conventional approximation that apparent waveform does not vary with offset is not always valid. As was indicated earlier in the discussion of FIG. 2, this apparent waveform variation may occur when closely spaced reflectors have reflection coefficients with different angular dependences. The effects of the failure of the assumptions of conventional velocity analysis can be seen in FIG. 5, which depict a comparison of conventional velocity analysis and the methods of the present invention applied to the data of FIG. 4.

Figure 5A:
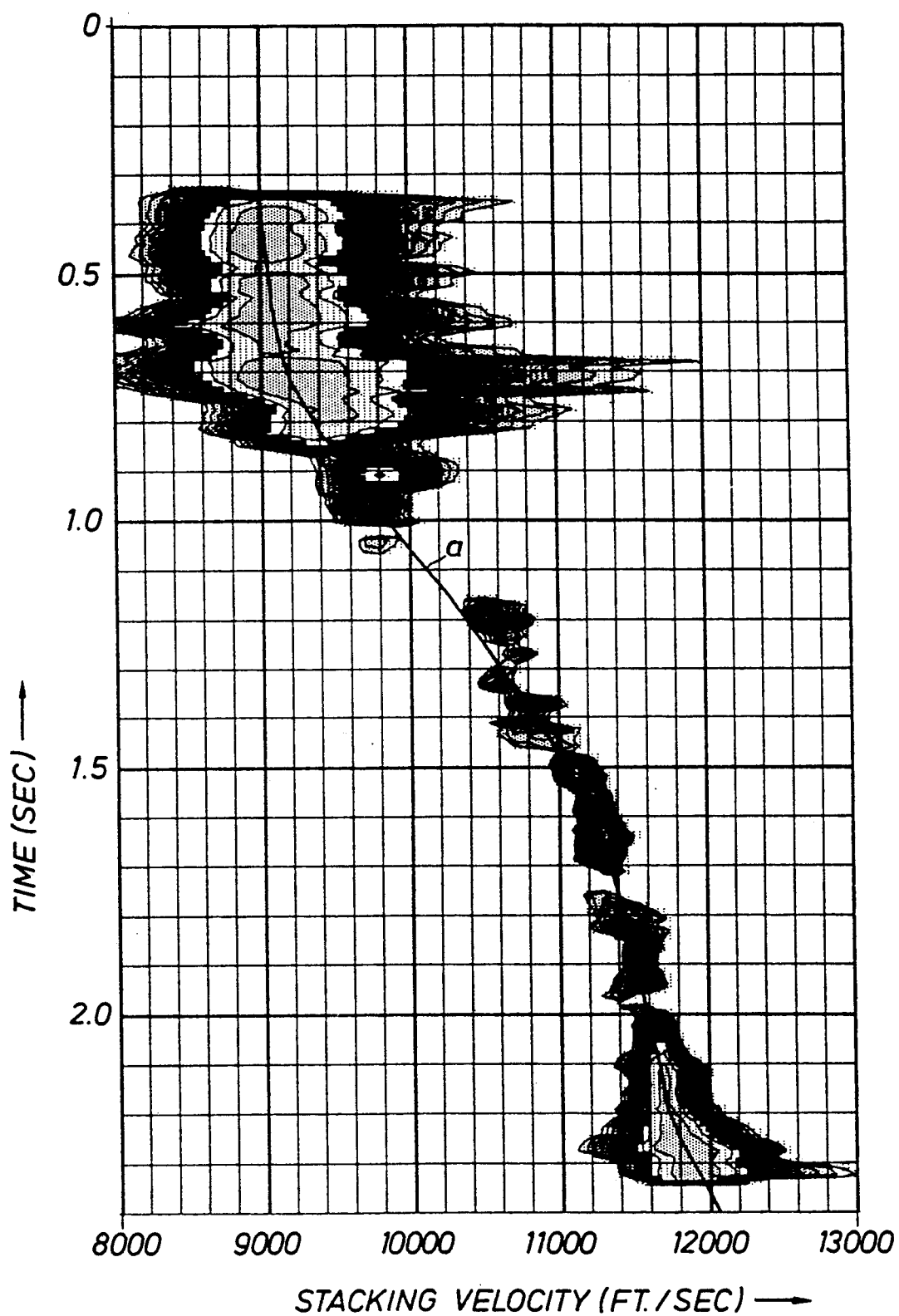
FIGS. 5A and 5B depict, for the data of FIG. 4, simplified representations of quality of fit coefficients of conventional velocity analysis and velocity analysis of the present invention, respectively, plotted as a function of t and estimated $V_e$.

Conventional velocity analysis was performed in the manner described hereinbefore and the results are shown in FIG. 5A. Quality-of-fit coefficients were posted at points on a two dimensional grid with trial effective velocity and vertical (zero offset) two-way travel time (t) as the two coordinate axes of the grid. For the displays of these quality of fit coefficients contouring and grey scale shadings were employed. However, other displays may be employed. The shading of the grey scale in FIGS. 5 and 6 is representative of the magnitude of the fitting coefficients (with a darker shading indicating a higher amplitude than an adjacent lighter shading except where the grey scale repeats, i.e., the light to dark scale repeats to allow coverage of a large range of amplitudes of the quality of fit coefficients with a small number of different shadings). The display techniques used herein are similar to those used in conventional velocity analysis but the underlying calculations of the present invention are not the same as those of such conventional velocity analysis.

Figure 5B:
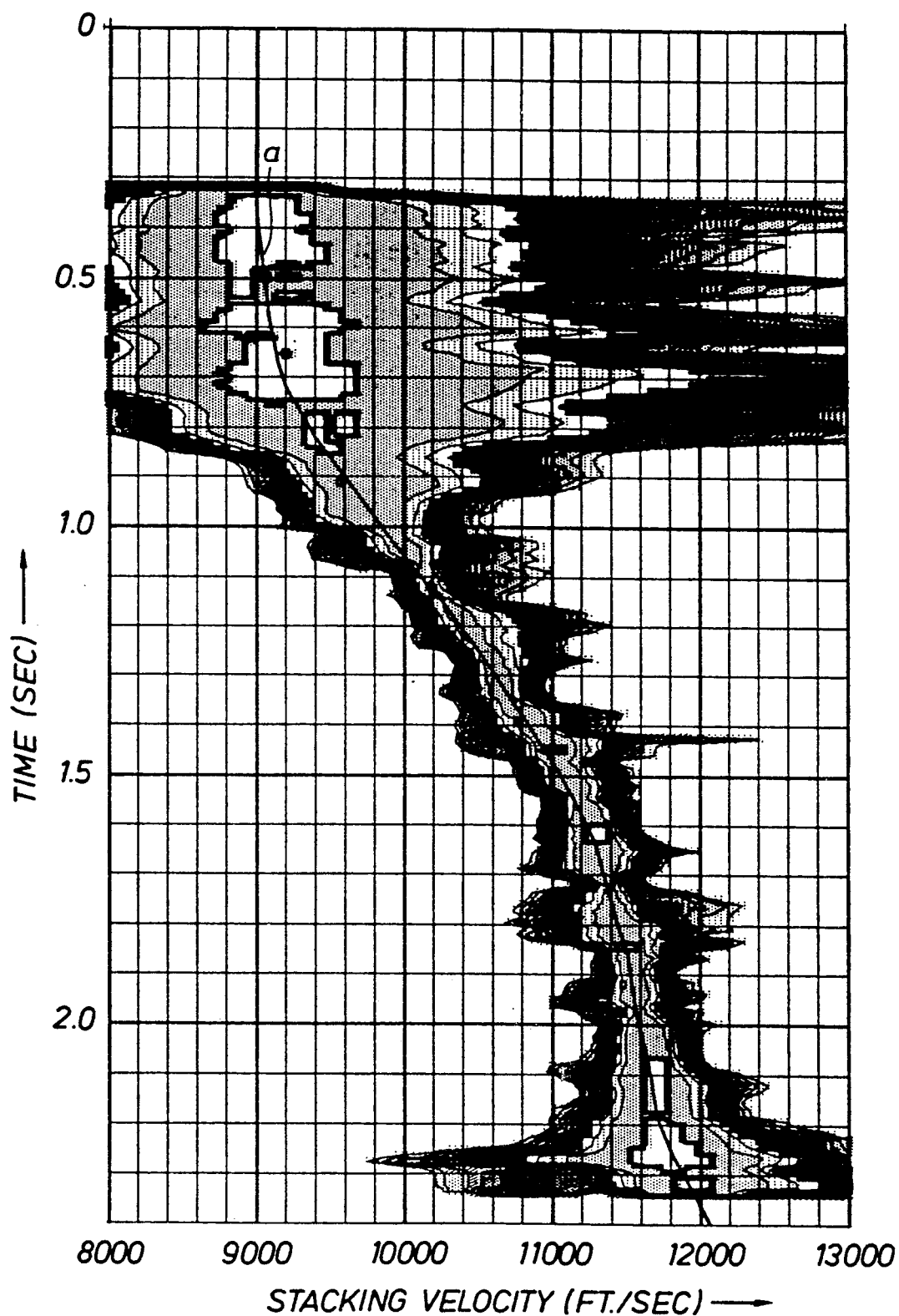
Figure 6A:
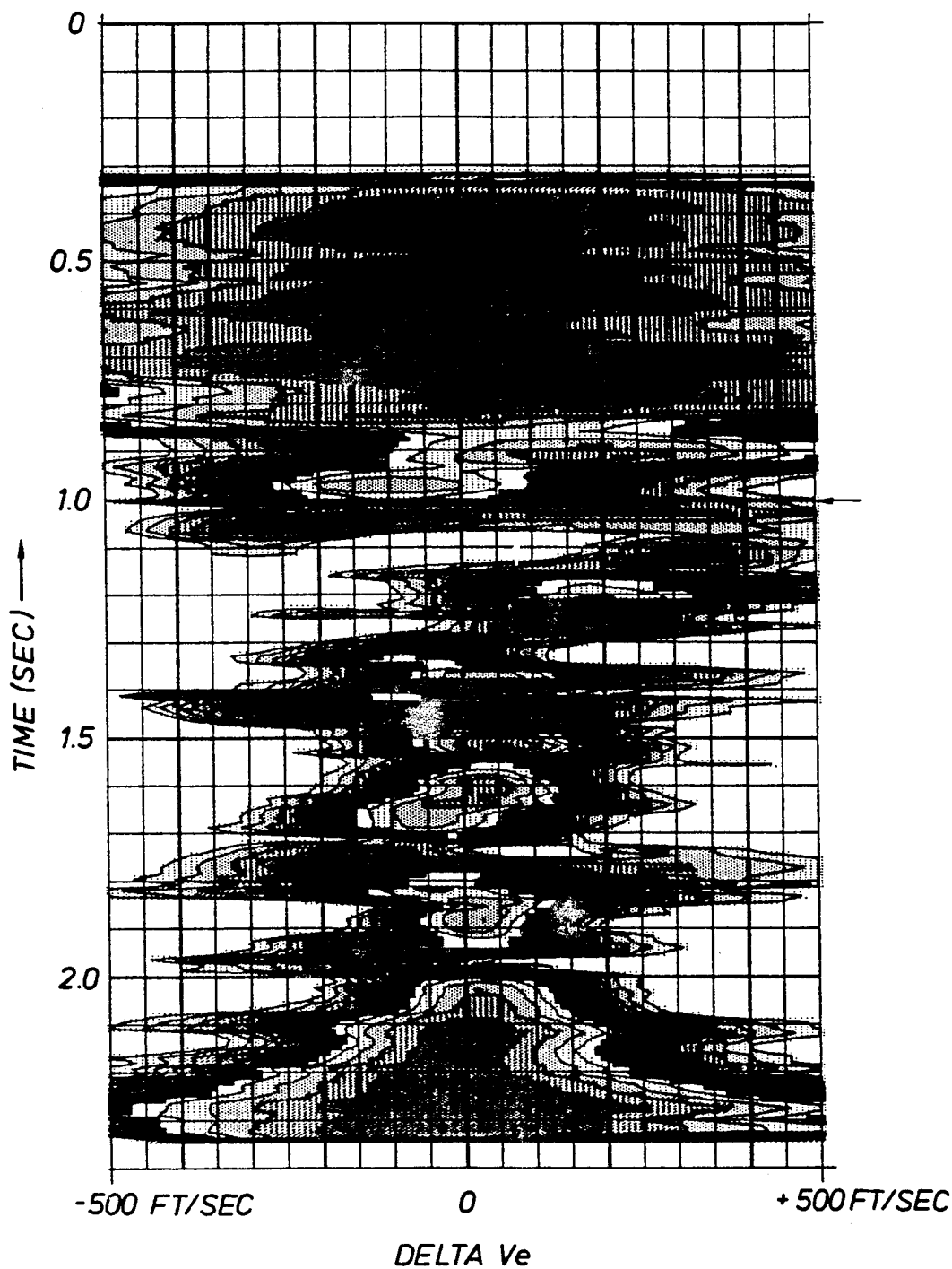
FIGS. 6A and 6B depict, for the data of FIG. 4, quality of fit coefficients recalculated and plotted as a function of t and the difference between estimated $V_e$ and true effective velocities from the model.

Referring now to FIG. 5, there may be seen a comparison of panels of the quality of fit coefficients from conventional velocity analysis (FIG. 5A) and from the preferred method of the present invention (FIG. 5B) for the data of FIG. 4. It may be seen that the maximum quality of fit coefficients for the method of the present invention, FIG. 5B, are much more continuous with time than those of the conventional velocity analysis, FIG. 5A. Even more importantly, the maxima occur for velocities more closely approximating the true effective velocity function determined from the model, which is depicted as curve "a" on both Figures.

FIGS. 6 A and B depict, in a modified display, corresponding portions of the quality of fit coefficient data depicted in FIG. 5. More particularly, Figs. 6 A and B depict panels of the quality of fit coefficients recalculated using trial velocities which differ from the true effective velocity by fixed amounts. They are plotted against t and delta $V_e$, the difference between estimated $V_e$ and true $V_e$. FIGS. 6 A and B show, just below one second, that conventional velocity analysis can result in $V_e$ estimate errors as great as $\pm 200$ ft/sec at times where the method of the present invention gave much more accurate values.

Figure 6B:
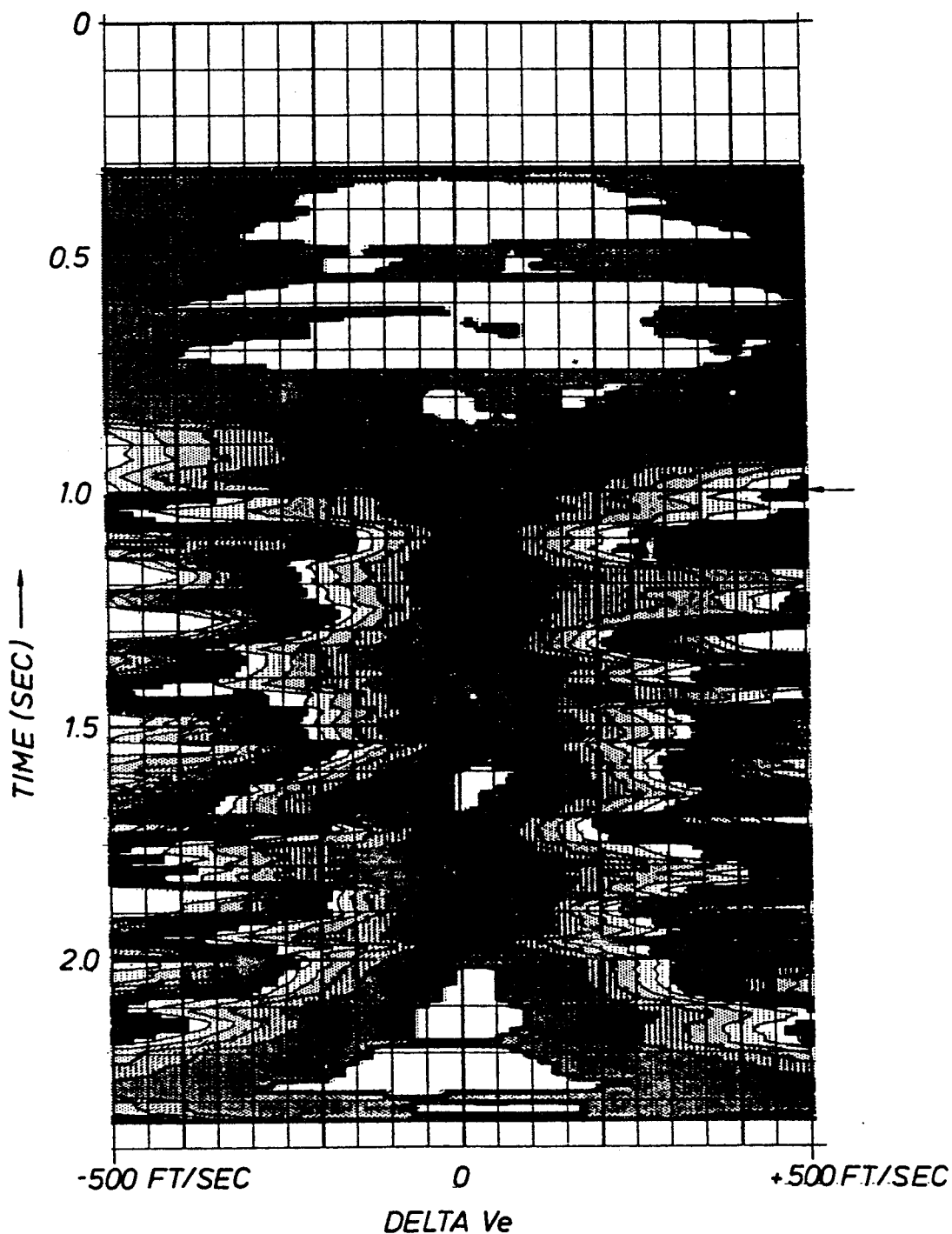
Figure 7B:
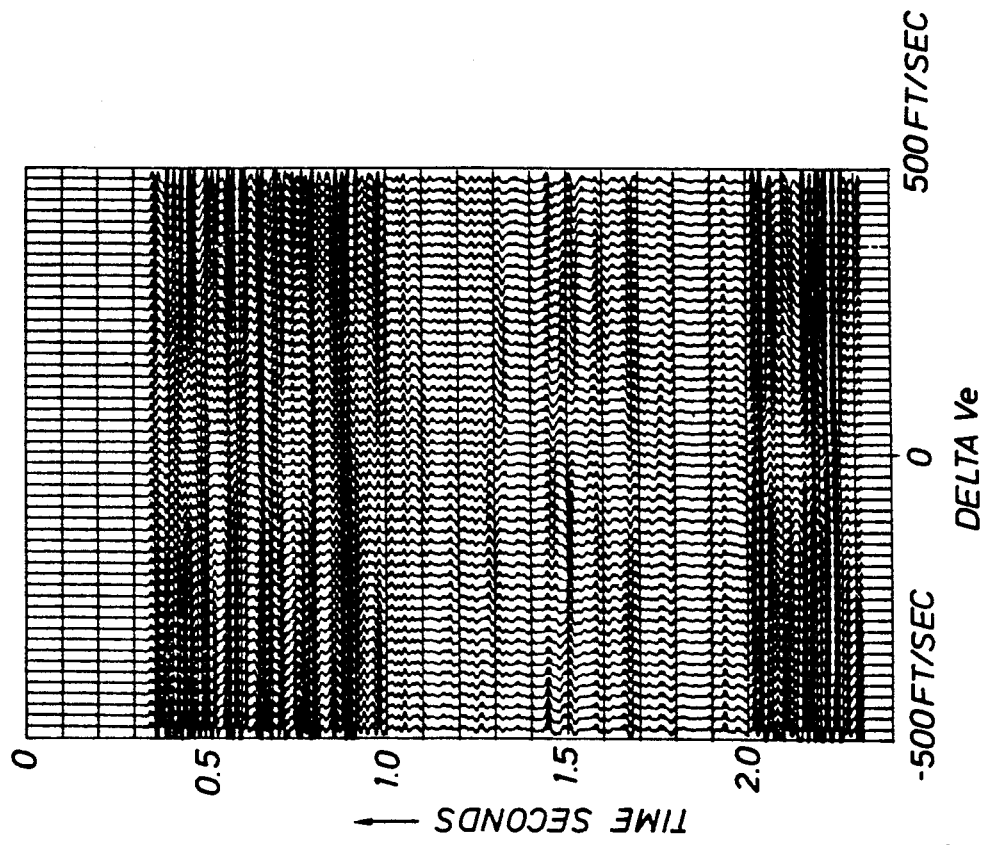
FIGS. 7A and 7B depict panels of A(t) and B(t) traces, respectively, corresponding to the individual velocity functions used to generate the quality of fit coefficients in FIG. 6B.
Figure 7A:
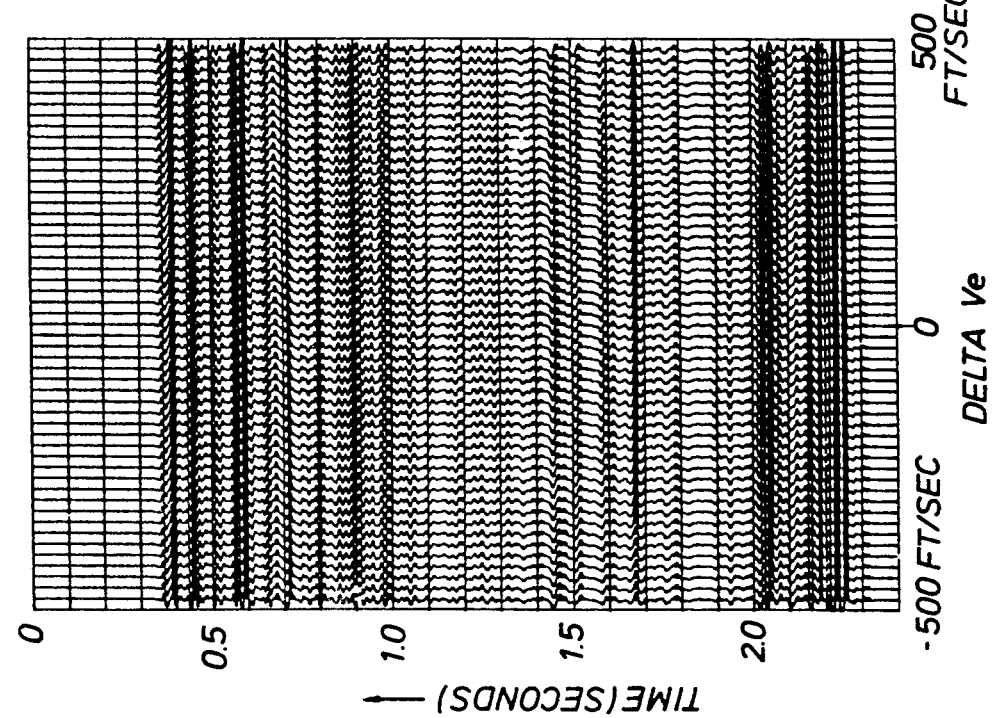

FIGS. 7 A and B depict panels of fitting coefficient traces A(t) and B(t), respectively, for the trial velocity functions used to generate FIG. 6B. In particular, the A(t) and B(t) trace panels, FIGS. 7A and 7B, respectively, consist of A(t) and B(t) traces computed with estimates of $V_e$ which differ from the true $V_e$ by the amounts indicated on the delta $V_e$ axis. The A(t) and B(t) traces computed with the true $V_e$ are in the center of the panels. The A(t) trace panel, FIG. 7A, which contains the normal incidence traces, shows that the A traces are relatively insensitive to velocity errors, that is, A(t) changes very slowly with delta $V_e$. From FIG. 7B, it is seen that the B traces are much more sensitive to velocity errors and an error of as little as 100 ft/sec may give a poor indication of the true offset dependence of the data. Thus, there is a need to select accurate velocities if the offset dependence is to be properly characterized.

Figure 8:
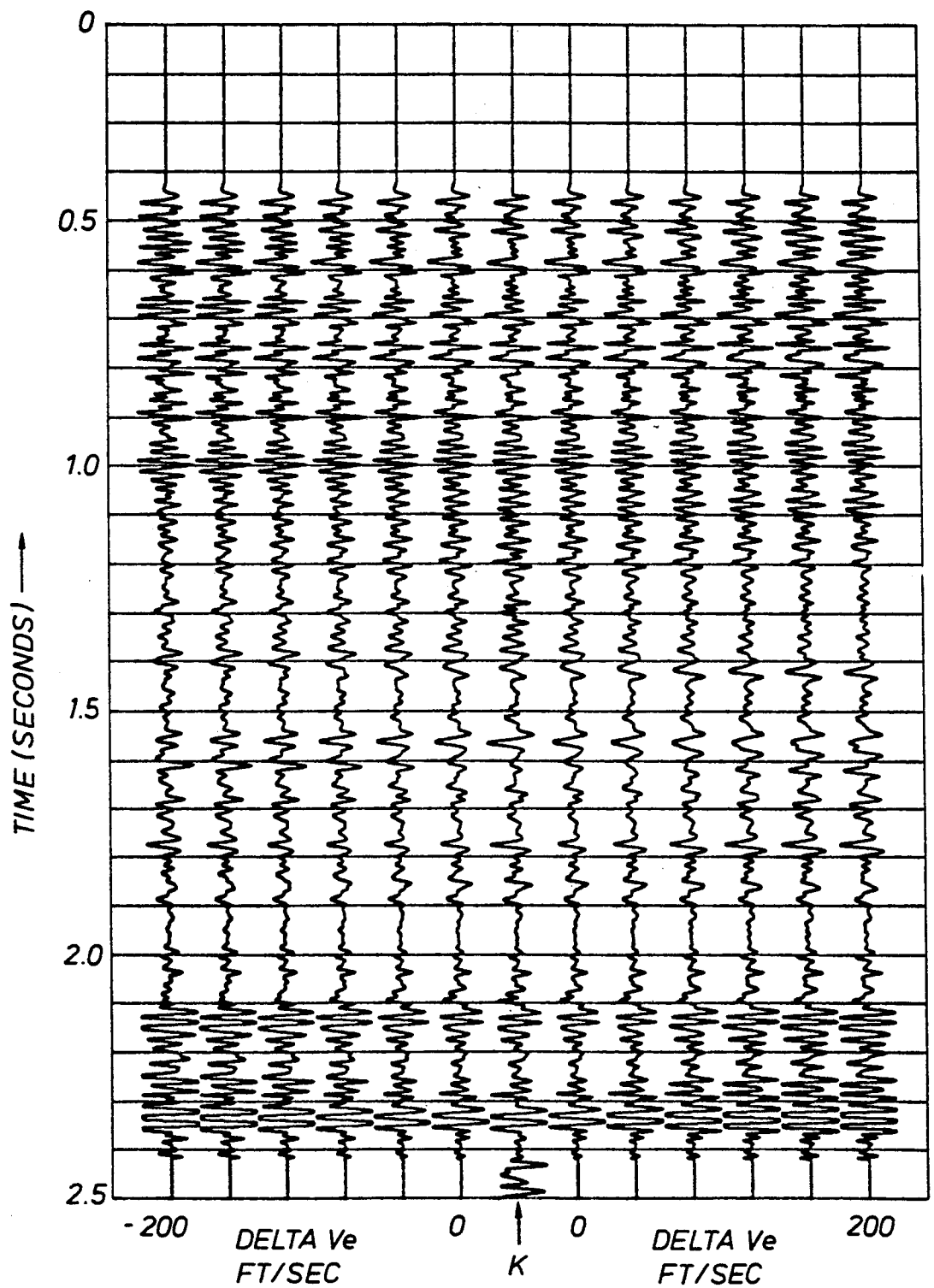
FIG. 8 depicts enlarged B(t) traces and corresponding model determined coefficients of $\sin^2\theta$.

In FIG. 8 an expanded scale of the B(t) panel, is compared to K, where K is the coefficient of $\sin^2(\theta)$ computed exactly from the input model and equation 6. (The exact trace is marked K.) There are several effects which would cause the measurement of B(t) of the present invention not to agree precisely with the coefficient, K, in equation 6, even when the correct moveout velocity is used. First, the measurement of B(t) is made with an effective incidence angle derived from a smooth interval velocity function. Second, the synthetic seismograms for this data set were generated using Zoeppritz's expression for the offset dependence of the reflection coefficients rather than the approximation of equation 6. Third, signal distortion due to normal moveout dynamic correction will somewhat limit the accuracy with which offset dependence can be measured by this method. (Note that all three of these effects may be accounted for at the interpretation stage.) In spite of these effects the agreement between the measured B(t) trace with small $V_e$ errors and the theoretical K calculated for this earth model is quite good and much better on average than the results obtained using $V_e$ from conventional velocity estimation procedures.

The interpretation of the normal incidence A(t) trace and offset dependence trace B(t) may be performed in many ways. For example, lateral variations in the A(t) and B(t) traces themselves may be empirically associated with local variations of lithology or fluid content. Other interpretations may best be made from various A(t) and B(t) trace combinations and ratios which tend to enhance or discriminate in favor of a particular physical property. For instance, in sedimentary rocks at depths of typical exploration interest, the $V_P/V_S$ ratio is often near 2. If this value is incorporated into the approximation given by equations 6 and 2, one obtains, $$R_P(\theta) = (R_\alpha + R_\rho) + (R_\alpha - R_\rho - 2R_\beta) \sin^2(\theta). \quad (15a)$$

If the small contrast expressions of equation 2f and equation 2g are used then equation 15a further simplifies to, $$R_P(\theta) = R_P(O) + [R_P(O) - 2R_S(O)] \sin^2\theta. \quad (15b)$$

For the approximation of equation 15b, (A−B)/2 should be a measure of the shear-wave reflectivity function $R_S(O)$. Lateral changes in compressional-wave reflectivity, $R_P$, as measured by A, which are not accompanied by a change in shear wave reflectivity, $R_S$, as measured by (A−B)/2, may be a good indication of a change in pore fluid. An example of this type of display is shown in FIGS. 9A and 9B.

FIG. 9A depicts a panel of the A traces for field seismic data (rather than synthetic) at a series of adjacent common midpoints and FIG. 9B depicts a panel of corresponding A-B traces for these same locations. Both FIGS. 9A and 9B have two seismic events marked "b" and "h" and common midpoint locations marked $X_1$, $X_2$, $X_3$, and $X_4$. Event "b" is a consistent right loop on both FIGS. 9A and 9B. Event "h" has a consistent strong left loop on FIG. 9A between $X_3$ and $X_4$ but changes to a weak and variable loop between $X_1$ and $X_3$. This systematic difference (i.e. increase in amplitude) between $X_3$ and $X_4$ is not visible on FIG. 9B. Thus, it may be suspected that event "b" is a reflection from a layer which does not have a difference in fluid content along the line of the section shown, e.g., it may be consistently brine-filled, while event "h" may be a reflection from a layer in which the fluid content differs along the line, in this case probably indicating gas between $X_3$ and $X_4$.

An indicator of small differences in the $V_P/V_S$ ratio on two sides of an interface may be determined by making the same approximations as those of equation 15b, along with the assumption that $R_P$ is small. Taking the derivative of $V_P/V_S$ yields $$d\left(\frac{V_P}{V_S}\right) = \left(\frac{V_P}{V_S}\right) \cdot \left(\frac{dV_P}{V_P}\right) - \qquad (16)$$

$$\left(\frac{dV_S}{V_S}\right) \cdot \left(\frac{V_P}{V_S}\right) \approx 4(R_\alpha - R_\beta) \approx 2(A + B)$$

Thus, the sum of $A+B$ may be a good indicator of $V_P/V_S$ ratio and lateral changes in the sum may indicate changes in rock type of fluid content. In typical cases, the change from brine-filled to gas-filled rocks produces a significant change in $V_P/V_S$. Further, if the compressional velocities are nearly constant, one would expect a change in $V_P/V_S$ to be an indication of a change in lithology.

In both of these cases simplifying approximations have been made which allow one to qualitatively predict the cause of observed changes in various displays. In most cases it is desirable to confirm these predictions using more accurate methods. One such method standard inverse modelling procedures similar to those suggested by Backus and Gilbert. See Backus, G. E. and Gilbert, F. J., "Numerical applications of a formalism for geophysical Inverse Problems", Geophys. J.R. Astr. Soc. 13, pp. 247-276, (1967); Backus, G. and Gilbert, F. "The resolving power of gross earth data", Geophys. J.R. Astr. Soc. 16, pp. 169-205, (1986); and Backus, G. and Gilbert, F., "Uniquenes in the inversion of inaccurate gross earth data", Phil. Trans. Roy. Soc., London 266, pp. 123-192, (1970).

Hence from the above, it is clear that the present invention provides methods for measuring effective velocity while appropriately accounting for the varying offset dependence of subsurface reflectors. The present invention determines traces A(t) (the "normal incidence trace") and B(t) (the offset dependence of the seismic data) which are desirable for useful lithologic and/or fluid content interpretation of seismic data.

The specific sequence of steps described hereinbefore for the methods of the present invention may be changed and still achieve the same result without departing from the scope of the present invention. As noted hereinbefore, the methods of the present invention are applicable to both compressional wave and/or shear wave seismic exploration techniques.

Many other variations and modifications may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the invention.

What is claimed is:

1. A method for processing seismic data, comprising:
   simultaneously determining moveout velocity, normal incidence reflection amplitude, and offset dependence of reflection amplitude, by an optimization process which uses the effects of said offset dependence of reflection amplitude to moveout velocity from said seismic data.

2. A method for processing seismic data, comprising:
   calculating effective reflection angles for various two-way travel times and offsets of said seismic data from a known reference velocity function,
   determining fitting coefficients for a preselected offset dependence function which expressly accounts for offset dependence of reflection amplitudes, from said seismic data and effective reflection angles for a trial moveout velocity function,
   repeating said determining of said fitting coefficients for a plurality of said trial moveout velocity functions, and
   selecting appropriate moveout velocities and fitting coefficients for various normal incidence two-way travel times.

3. A method as described in claim 2, further comprising:
   determining seismic attributes from said selected fitting coefficients.

4. A method as described in claim 2, further comprising:
   determining an improved reference velocity function from said selected appropriate moveout velocities, and
   redetermining said fitting coefficients and moveout velocities employing said improved reference velocity function.

5. A method as described in claim 4, further comprising:
   displaying said fitting coefficients in a manner that is representative of measured normal incidence and measured offset dependence from said seismic data for said selected moveout velocities.

6. A method for processing seismic data, comprising:
   selecting a reference velocity function for a region of interest,
   calculating effective reflection angles for various offsets and two-way travel times used to acquire said seismic data,
   determining moveout velocities by optimizing the coefficients of a function expressly includign offset dependence of reflection amplitudes to fit the offset dependence of said data, and
   displaying attributes determined from said coefficients that are representative of measured zero offset and measured offset dependence from the seismic data for said selected moveout velocities.

7. A method for processing seismic data, comprising:
   developing an initial velocity model having known or estimated parameters,
   performing raytracing through said model to determine reflection angles, $\theta$, and values of $\sin^2\theta$ for a plurality of offsets and travel time,
   dynamically correcting said data with a plurality of selected moveout velocity functions,
   determining fitting coefficients corresponding to normal incidence reflection amplitude, A, and amplitude variation with offset, B, for each zero offset travel time of said data by fitting the amplitudes of said seismic data to a form $A+B\sin^2\theta$ using a least-squared-error fitting technique, calculating a quality of fit coefficient for said least-squared-error fitting, selecting a moveout velocity function that maximizes the quality of fit coefficient for a plurality of travel times, interpolating a continuous moveout velocity function between said plurality of travel times, and then determining fitting coefficient traces from said fitting coefficients corresponding to said interpolated moveout velocity function.

8. The method of claim 7, further comprising:

modifying said initial velocity model based upon said selected moveout velocity function, and then reperforming the foregoing steps to select an improved moveout velocity function, and then redetermining fitting coefficient traces corresponding to said improved moveout velocity function.

9. The method of claim 8, further comprising:
displaying said fitting coefficient traces.

10. The method of claim 8, further comprising:
determining seismic attributes from said fitting coefficient traces.

11. The method of claim 10, further comprising:
displaying said seismic attributes.

12. The method of claim 10, further comprising:
interpreting said seismic attributes to determine elastic properties and densities.

* * * * *